(12) United States Patent
Sato et al.

(10) Patent No.: US 12,307,687 B2
(45) Date of Patent: May 20, 2025

(54) FOREGROUND EXTRACTION APPARATUS, FOREGROUND EXTRACTION METHOD, AND RECORDING MEDIUM

(71) Applicant: NEC Corporation, Tokyo (JP)

(72) Inventors: Hideaki Sato, Tokyo (JP); Kyota Higa, Tokyo (JP); Yasunori Babazaki, Tokyo (JP); Hiroyoshi Miyano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 434 days.

(21) Appl. No.: 17/783,715

(22) PCT Filed: Dec. 16, 2019

(86) PCT No.: PCT/JP2019/049236
§ 371 (c)(1),
(2) Date: Jun. 9, 2022

(87) PCT Pub. No.: WO2021/124417
PCT Pub. Date: Jun. 24, 2021

(65) Prior Publication Data
US 2023/0010199 A1    Jan. 12, 2023

(51) Int. Cl.
*G06T 7/246* (2017.01)
*G06T 7/215* (2017.01)
*G06V 10/26* (2022.01)
*G06V 10/77* (2022.01)
*G06V 10/774* (2022.01)

(52) U.S. Cl.
CPC ............. *G06T 7/246* (2017.01); *G06T 7/215* (2017.01); *G06V 10/267* (2022.01); *G06V 10/7715* (2022.01); *G06V 10/774* (2022.01); *G06T 2207/10016* (2013.01)

(58) Field of Classification Search
None
See application file for complete search history.

(56) References Cited

U.S. PATENT DOCUMENTS 6,977,664 B1 * 12/2005 Jinzenji ................... G06T 7/254
382/243
7,424,157 B2 * 9/2008 Pace ..................... H04N 19/132
375/E7.076

(Continued)

FOREIGN PATENT DOCUMENTS

JP    2001-319236 A    11/2001
JP    2010-205007 A    9/2010

(Continued)

OTHER PUBLICATIONS

International Search Report for PCT Application No. PCT/JP2019/049238, mailed on Mar. 3, 2020.

*Primary Examiner* — Tsung Yin Tsai

(57) ABSTRACT

In a foreground extraction apparatus, an extraction result generation unit performs a foreground extraction using a plurality of foreground extraction models for an input image, and generates foreground extraction results. A selection unit selects one or more foreground extraction models among the plurality of foreground extraction models using respective foreground results acquired by the plurality of foreground extraction models. A foreground region generation unit extracts each foreground region based on the input image using the selected one or more foreground extraction models.

9 Claims, 18 Drawing Sheets

(56) References Cited

U.S. PATENT DOCUMENTS

| | | | |
|---|---|---|---|
| 10,044,944 B2* | 8/2018 | Adsumilli | G06T 5/70 |
| 10,867,394 B2* | 12/2020 | Akiyama | G06V 20/53 |
| 2006/0067562 A1* | 3/2006 | Kamath | G06T 7/254 |
| | | | 382/103 |
| 2007/0116356 A1* | 5/2007 | Gong | G06T 7/194 |
| | | | 382/173 |
| 2010/0226563 A1 | 9/2010 | Takayama et al. | |
| 2016/0337555 A1* | 11/2016 | Li | H04N 23/90 |
| 2017/0154273 A1* | 6/2017 | Guttmann | G06V 10/94 |
| 2018/0033271 A1* | 2/2018 | Xia | G02B 3/08 |
| 2018/0114324 A1* | 4/2018 | Kim | G06T 5/50 |
| 2018/0122114 A1* | 5/2018 | Luan | H04N 21/44016 |
| 2019/0156491 A1* | 5/2019 | Akiyama | G06V 20/53 |
| 2019/0294887 A1 | 9/2019 | Zhao | |
| 2021/0390316 A1* | 12/2021 | Schoneveld | G06V 20/41 |
| 2023/0069347 A1* | 3/2023 | Backhus | G06N 5/04 |
| 2023/0120093 A1* | 4/2023 | Ogawa | G06T 7/246 |
| | | | 382/103 |
| 2023/0419510 A1* | 12/2023 | Ogawa | G06T 7/248 |

FOREIGN PATENT DOCUMENTS

| | | |
|---|---|---|
| JP | 2019-169145 A | 10/2019 |
| WO | 2009/102001 A1 | 8/2009 |

* cited by examiner

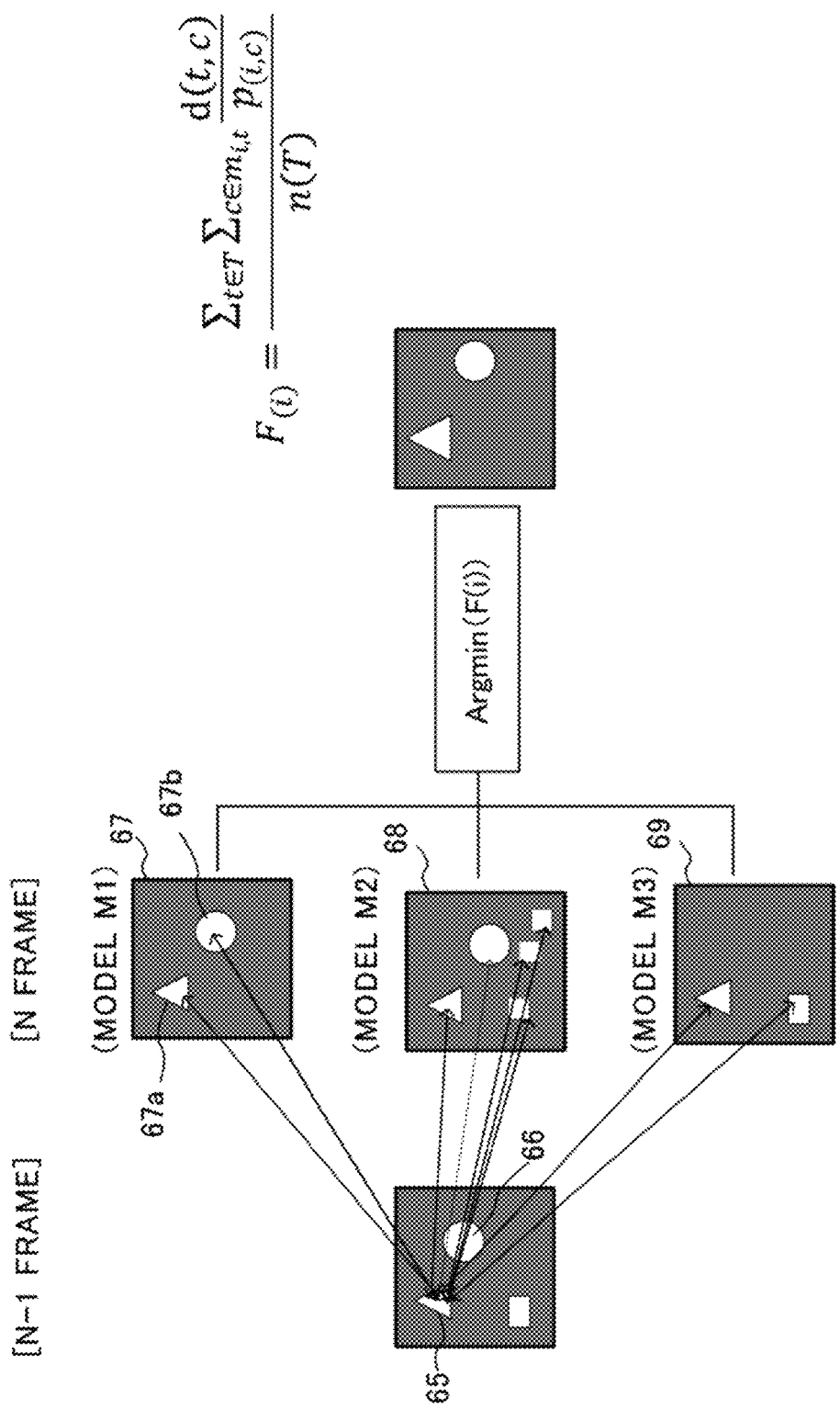

FIG. 5

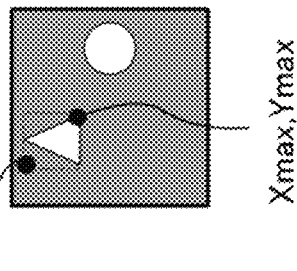

⟨TIME SERIES INFORMATION⟩

| FRAME NUMBER | TRACKER NUMBER | COORDINATE VALUES | FRAME NUMBER | FOREGROUND EXTRACTION MODEL | FOREGROUND LABEL | COORDINATE VALUES |
|---|---|---|---|---|---|---|
| N−1 | 1 | Xmin,Ymin, Xmax,Ymax | N | M1 | 1 | Xmin,Ymin, Xmax,Ymax |
| N−1 | 1 | Xmin,Ymin, Xmax,Ymax | N | M1 | 2 | Xmin,Ymin, Xmax,Ymax |
| N−1 | 2 | Xmin,Ymin, Xmax,Ymax | N | M2 | 1 | Xmin,Ymin, Xmax,Ymax |
| N−1 | 2 | Xmin,Ymin, Xmax,Ymax | N | M1 | 2 | Xmin,Ymin, Xmax,Ymax |
| N−1 | 1 | Xmin,Ymin, Xmax,Ymax | N | M3 | 1 | Xmin,Ymin, Xmax,Ymax |
| · | · | · | · | · | · | · |
| · | · | · | · | · | · | · |
| N−1 | ① | Xmin,Ymin, Xmax,Ymax | N | M3 | 1 | Xmin,Ymin, Xmax,Ymax |

FIG. 14
(FOREGROUND EXTRACTION MODEL 1)
$S=(X_1, X_2, X_3, \cdots, X_n)$
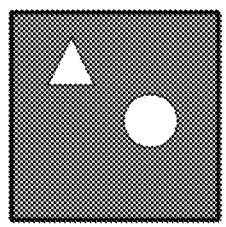
(—)
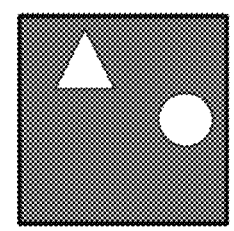
FOREGROUND EXTRACTION RESULT $I_k$
CORRECT ANSWER DATA I
(FOREGROUND EXTRACTION MODEL 2)
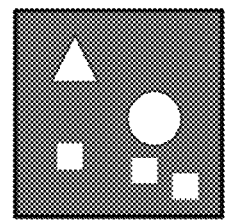
(FOREGROUND EXTRACTION MODEL 3)
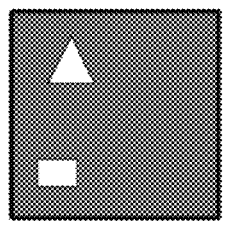

FOREGROUND EXTRACTION APPARATUS, FOREGROUND EXTRACTION METHOD, AND RECORDING MEDIUM

This application is a National Stage Entry of PCT/JP2019/049236 filed on Dec. 16, 2019, the contents of all of which are incorporated herein by reference, in their entirety.

TECHNICAL FIELD

The present disclosure relates to a technique for extracting objects included in an image.

BACKGROUND ART

In recent years, drones have been utilized for various applications. In a case where the drones have become popularly used, it is considered that an air traffic control of drones will be necessary. For example, it is necessary to monitor surroundings of the drones to be managed using images taken by cameras installed on the ground. Specifically, in an aviation control work of drones, it is necessary to detect small moving objects based on captured images, to identify uncontrollable objects such as birds and drones other than managed drones, and to automatically perform collision avoidance by immediately controlling the drones to be managed.

Patent Document 1 describes a method for determining whether or not a flying object is a bird by extracting a flying object based on a captured image and comparing the flying object with a flight pattern prepared in advance.

PRECEDING TECHNICAL REFERENCES

Patent Document

Patent Document 1: International Publication No. WO2009/102001

SUMMARY

Problem to be Solved by the Invention

Patent Document 1 described above identifies a flying object based on flight patterns of the flying object. Therefore, the flying object is not identified in a case of failure to detect the flying object and of failure to acquire a movement trajectory.

It is one object of the present disclosure to accurately extract moving objects included in an image.

Means for Solving the Problem

According to an example aspect of the present disclosure, there is provided a foreground extraction apparatus including:

an extraction result generation unit configured to generate respective foreground extraction results by performing a foreground extraction using a plurality of foreground extraction models with respect to an input image;
a selection unit configured to select one or more foreground extraction models from among the plurality of foreground extraction models by using the respective foreground extraction results of the plurality of foreground extraction models; and
a foreground region generation unit configured to extract each foreground region based on the input image by using the selected one or more foreground extraction models.

According to another example aspect of the present disclosure, there is provided a foreground extraction method foreground extraction method comprising:

generating respective foreground extraction results by performing a foreground extraction using a plurality of foreground extraction models with respect to an input image;
selecting one or more foreground extraction models from among the plurality of foreground extraction models by using the respective foreground extraction results of the plurality of foreground extraction models; and
extracting each foreground region based on the input image by using the selected one or more foreground extraction models.

generating respective foreground extraction results by performing a foreground extraction using a plurality of foreground extraction models with respect to an input image;
selecting one or more foreground extraction models from among the plurality of foreground extraction models by using the respective foreground extraction results of the plurality of foreground extraction models; and
extracting each foreground region based on the input image by using the selected one or more foreground extraction models.

According to a further example aspect of the present disclosure, there is provided a recording medium storing a program, the program causing a computer to perform a process including:

generating a foreground extraction result by performing a foreground extraction using a plurality of foreground extraction models with respect to an input image;
selecting one or more foreground extraction models from among the plurality of foreground extraction models by using the foreground extraction result of each of the plurality of foreground extraction models; and
extracting each foreground region based on the input image by using the selected one or more foreground extraction models.

Effect of the Invention

According to the present disclosure, it is possible to accurately extract moving objects included in an image.

BRIEF DESCRIPTION OF THE DRAWINGS

FIG. 4 is a diagram for explaining a generation method of time series information.

FIG. 5 illustrates an example of the time series information.

FIG. 14 schematically illustrates a learning method by a selection model training unit.

EXAMPLE EMBODIMENTS

In the following, example embodiments will be described with reference to the accompanying drawings.
<Basic Concept>
First, a basic concept of a foreground extraction method according to example embodiments will be described. In a case where a small moving object in flight (hereinafter, referred to as a "small moving object") or an area of the small moving object is extracted from an image photographing the sky, a background subtraction technique is used. Incidentally, a moving object included in the image is also referred to as a "foreground". The background subtraction technique is a technique to detect moving objects based on a difference between successive frame images, and various background subtraction techniques are known. However, these background subtraction methods are good at respective different situations, respectively, and it is difficult to extract a foreground continuously with high accuracy using only one background subtraction technique.

Accordingly, in the following example embodiments, a plurality of foreground extraction methods are prepared, and one or more foreground extraction methods suitable in individual situations are selected to perform a foreground extraction. Specifically, a result from applying the plurality of foreground extraction methods to successive frame images is evaluated to select an appropriate foreground extraction method, and a selected foreground extraction method is used to extract a foreground.

First Example Embodiment

Figure 1:
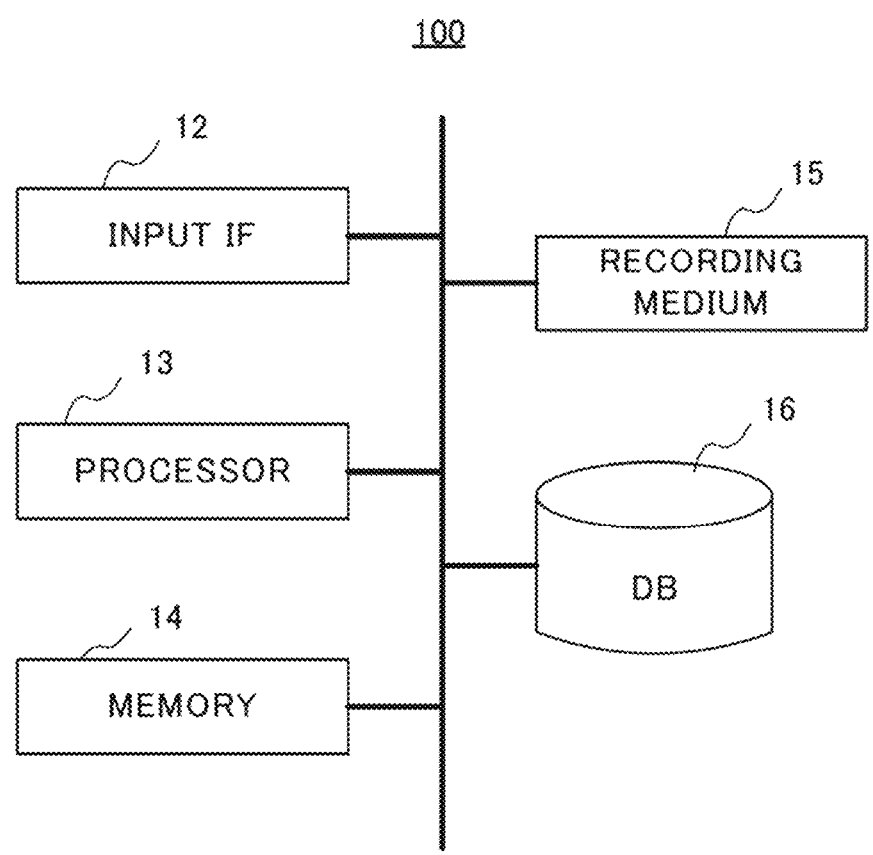
FIG. 1 illustrates a hardware configuration of a foreground extraction apparatus according to example embodiments.

[Hardware Configuration]
FIG. 1 is a block diagram illustrating a hardware configuration of a foreground extraction apparatus according to a first example embodiment. As illustrated, a foreground extraction apparatus 100 includes an input IF (InterFace) 12, a processor 13, a memory 14, a recording medium 15, and a database (DB) 16.

The input IF 12 acquires input images to be processed by the foreground extraction apparatus 100. For instance, each image, which a camera installed on the ground photographs moving objects flying through the sky, is input through the input IF 12. The processor 13 is a computer such as a CPU (Central Processing Unit) and controls the entire foreground extraction apparatus 100 by executing programs prepared in advance. Specifically, the processor 13 executes a foreground extraction process to be described later.

The memory 14 is formed by a ROM (Read Only Memory), a RAM (Random Access Memory), or the like. The memory 14 stores various programs to be executed by the processor 13. The memory 14 is also used as a working memory during executions of various processes by the processor 13.

The recording medium 15 is a non-volatile and non-transitory recording medium such as a disk-shaped recording medium or a semiconductor memory, and is formed to be detachable from the foreground extraction apparatus 100. The recording medium 15 records various programs executed by the processor 13. In a case where the foreground extraction apparatus 100 executes various kinds of processes, respective programs recorded on the recording medium 15 are loaded into the memory 14 and executed by the processor 13.

The database 16 stores data input from an external apparatus including an input IF 12. Specifically, an input image to be processed by the foreground extraction apparatus 100 is stored. In addition to the above, the foreground extraction apparatus 100 may include an input device such as a keyboard or a mouse for a user to perform instructions or inputs, or a display unit.

First Example

Figure 2:
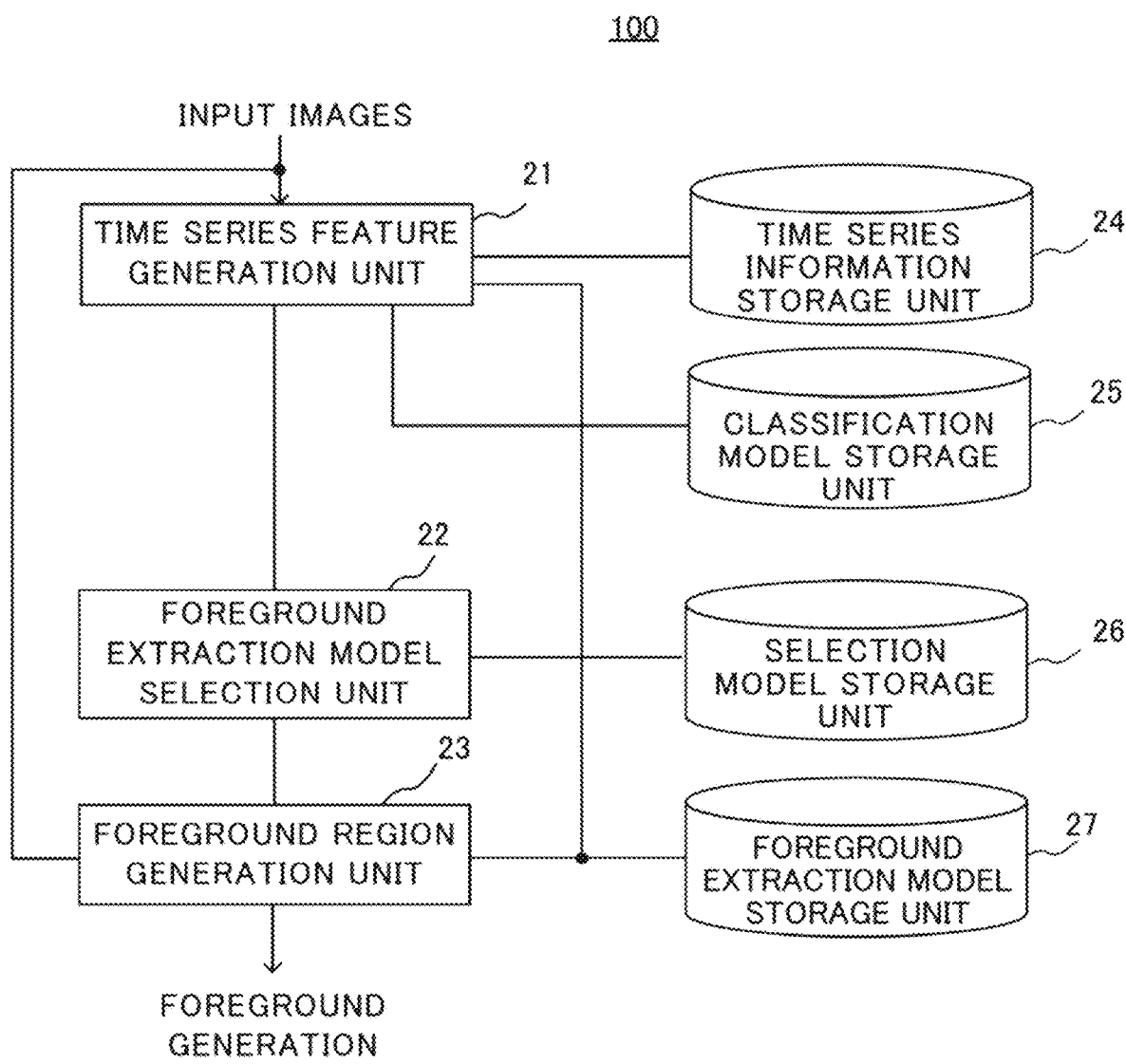
FIG. 2 illustrates a functional configuration of a foreground extraction apparatus according to a first example of a first example embodiment.

Next, a first example of the first example embodiment will be described.
(Functional Configuration)
FIG. 2 is a block diagram illustrating a functional configuration of the foreground extraction apparatus 100 according to the first example of the first example embodiment. As illustrated, the foreground extraction apparatus 100 includes a time series feature generation unit 21, a foreground extraction model selection unit 22, a foreground region generation unit 23, a time series information storage unit 24, a classification model storage unit 25, a selection model storage unit 26, and a foreground extraction model storage unit 27.

Input images formed by a plurality of frame images are input to the time series feature generation unit 21. The time series feature generation unit 21 generates time series features from the input images and supplies the time series features to the foreground extraction model selection unit 22. The "time series features" correspond to features in successive frame images and are generated using trackers included in successive frames.

Figure 3:
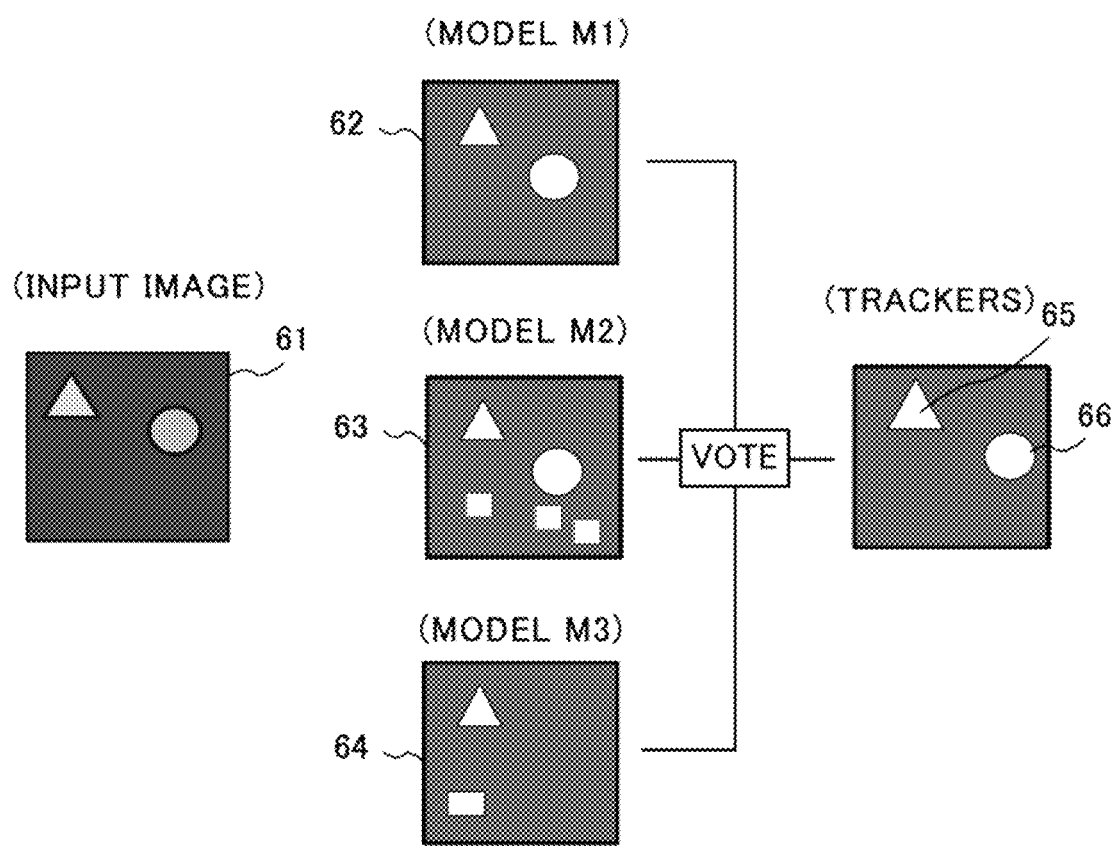
FIG. 3 is a diagram for explaining a generation method of trackers.

Here, the tracker will be described first. The "tracker" refers to an object that is detected and associated with each other in adjacent frames. FIG. 3 is a diagram illustrating a method for generating the trackers. Now, it is assumed that the time series feature generation unit 21 acquires and uses three foreground extraction models M1 through M3 from the foreground extraction model storage unit 27. The time series feature generation unit 21 applies the foreground extraction models M1 through M3 to an input image 61 illustrated in FIG. 3 to obtain foreground extraction results 62 through 64. The time series feature generation unit 21 votes for the foreground extraction results 62 through 64, and determines objects included in a majority of the foreground extraction results 62 through 64 as the trackers. In the example in FIG. 3, an object (a triangle) 65 and an object (a circles) 66 included in the majority of the foreground extraction results 62 through 64 are extracted as the trackers, respectively.

When the tracker is generated, the time series feature generation unit 21 generates time series information using each tracker. The time series information is information used to extract a time series feature. FIG. 4 is a diagram illustrating a method for generating the time series information. Now, suppose that there are successive N−1 and N frames, and trackers 65 and 66 are extracted from the N−1 frame as described above. The time series feature generation unit 21 generates the foreground extraction results 67 through 69 by applying the foreground extraction models M1 through M3 to an input image of the N frame. In an example in FIG. 4, the foreground extraction result 67 includes one triangle foreground 67*a* and one circular foreground 67*b*. The foreground extraction result 68 includes one triangular foreground, one circular foreground, and three square foregrounds. The foreground extraction result 69 includes one triangle foreground and one square foreground. As indicated by an arrow, the time series feature generation unit 21 makes a pair of each tracker of the N−1 frame and the foregrounds extracted by each foreground extraction model from the N frame, and generates a correspondence as time series information.

FIG. 5 illustrates an example of the time series information. The time series information includes items of a "frame number," a "tracker number," and "coordinate values" for a frame one before a frame in which the foreground extraction has been performed. In the example in FIG. 4, the time series information includes, for the N−1 frame, each number of two trackers 65 and 66 and these coordinates. Here, the number of the tracker 65 is set to "1", and the number of the tracker 66 is set to "2". In addition, the time series information includes a "frame number", a "foreground extraction model", a "foreground label", and "coordinate values" for the frame in which the foreground extraction has been performed. In the example in FIG. 4, the time series information includes the frame number, any of the foreground extraction models M1 through M3, the foreground label that identifies each foreground included in the foreground extraction results 67 through 69, and the coordinate values of the foreground, for the N frame for which the foreground extraction was performed. Incidentally, as illustrated in FIG. 5, the coordinate values are indicated by coordinates of an upper left point and a lower right point of a rectangle surrounding a tracker or a foreground.

Next, the time series feature generation unit 21 generates each time series feature using the time series information. First, the time series feature generation unit 21 calculates a distance between the tracker 65 generated in the N−1 frame and each of foregrounds included in the foreground extraction results 67 to 69, as indicated by arrows in FIG. 4. Specifically, the time series feature generation unit 21 calculates a distance between the tracker 65 and a triangle foreground 67*a* based on coordinates of the tracker 65 in the N−1 frame and coordinates of the triangle foreground 67*a* in the foreground extraction result 67 of the N frame. Similarly, the time series feature generation unit 21 calculates each distance between the tracker 65 and each of the foregrounds included in the foreground extraction results 67 to 69. In the same manner, the time series feature generation unit 21 calculates each distance between respective foregrounds included in the foreground extraction results 67 through 69 for other trackers generated in the N−1 frame. In the example in FIG. 4, the time series feature generation unit 21 calculates each distance between the tracker 66 and each of the foregrounds included in the foreground extraction results 67 to 69.

Furthermore, the time series feature generation unit 21 acquires a classification model from the classification model storage unit 25 illustrated in FIG. 2, and calculates a foreground degree for each of the foregrounds included in the foreground extraction results 67 to 69 of the N frame using the classification model. Note that the classification model corresponds to a model that outputs the foreground degree of the foreground (a score of a likelihood of a foreground) based on a shape of the input foreground.

Accordingly, when respective distances from each tracker to each of the foregrounds included in the foreground extraction results 67 through 69 of the N frame, and the foreground degree are obtained, the time series feature generation unit 21 calculates a score $F_{(i)}$ for each of the foreground extraction models as the time series feature using the following formula (1).

[Formula 1]

$$F_{(i)} = \frac{\sum_{t \in T} \sum_{c \in m_{i,t}} \frac{d(t, c)}{p(i, c)}}{n(T)} \quad (1)$$

Where a 't' denotes a tracker number. An 'i' denotes a foreground extraction model and a 'c' denotes a label of a foreground extracted by the foreground extraction model. A 'd(t,c)' denotes a distance between a tracker t and a foreground c, and a 'p(i,c)' denotes a foreground degree of the foreground c extracted by a foreground extraction model i. An 'n(T)' denotes a number of trackers. Hence, the score $F_{(i)}$ is obtained by summing every value acquired by dividing a distance d(t,c) between a tracker t and a foreground c by the foreground degree p(i,c) of the foreground c, for all trackers t and foregrounds c concerning a certain foreground extraction model i, and by dividing the summed value by the number n(T) of the trackers. In the example in FIG. 4, the time series feature generation unit 21 calculates respective scores $F_{(1)}$ through $F_{(3)}$ for the three foreground extraction models M1 through M3, and supplies the scores $F_{(1)}$ through $F_{(3)}$ to the foreground extraction model selection unit 22 as the time series features.

Here, the score $F_{(i)}$ indicates that the smaller the value, the higher the accuracy of extracting foregrounds. This reason is explained as follows. First, in the formula (1), the greater the distance d(t,c) between a tracker and a foreground, the greater the score $F_{(i)}$. Since an amount of a movement between adjacent frames is small regarding an actual small moving object, the larger the distance d(t,c), the higher the possibility that a foreground is noise, and the smaller the distance d(t,c), the higher the possibility that the foreground is the small moving object. In the formula (1), the distance d(t,c) is divided by the foreground degree p(i,c), so the higher the foreground degree (foreground likelihood) of the extracted foreground, the smaller the score $F_{(i)}$. Accordingly, the smaller the score $F_{(i)}$, the higher the accuracy of the foreground extraction.

The foreground extraction model selection unit 22 selects one or more foreground extraction models from among the plurality of foreground extraction models based on the supplied time series features, that is, the scores $F_{(i)}$ of the foreground extraction models. In a typical example, the foreground extraction model selection unit 22 selects one foreground extraction model having the smallest score $F_{(i)}$ among the plurality of foreground extraction models. In another example, the foreground extraction model selection unit 22 may select a predetermined number of foreground extraction models from which the score $F_{(i)}$ is smaller, and may use them in combination.

The foreground region generation unit 23 extracts and outputs a region of the foreground (referred to as a "foreground region") from an input image using the foreground extraction model selected by the foreground extraction model selection unit 22. For instance, in a case where the foreground extraction model selection unit 22 selects one foreground extraction model having the smallest score $F_{(i)}$, the foreground region generation unit 23 acquires the foreground extraction model from the foreground extraction model storage unit 27 and applies the foreground extraction model to the input image, so as to extract and output the foreground region. On the other hand, in a case where the foreground extraction model selection unit 22 selects a plurality of foreground extraction models, the foreground region generation unit 23 may perform the aforementioned voting on the foreground extraction results generated using the foreground extraction models, and output a foreground region exceeding the majority.

(Foreground Extraction Process)

Figure 6:
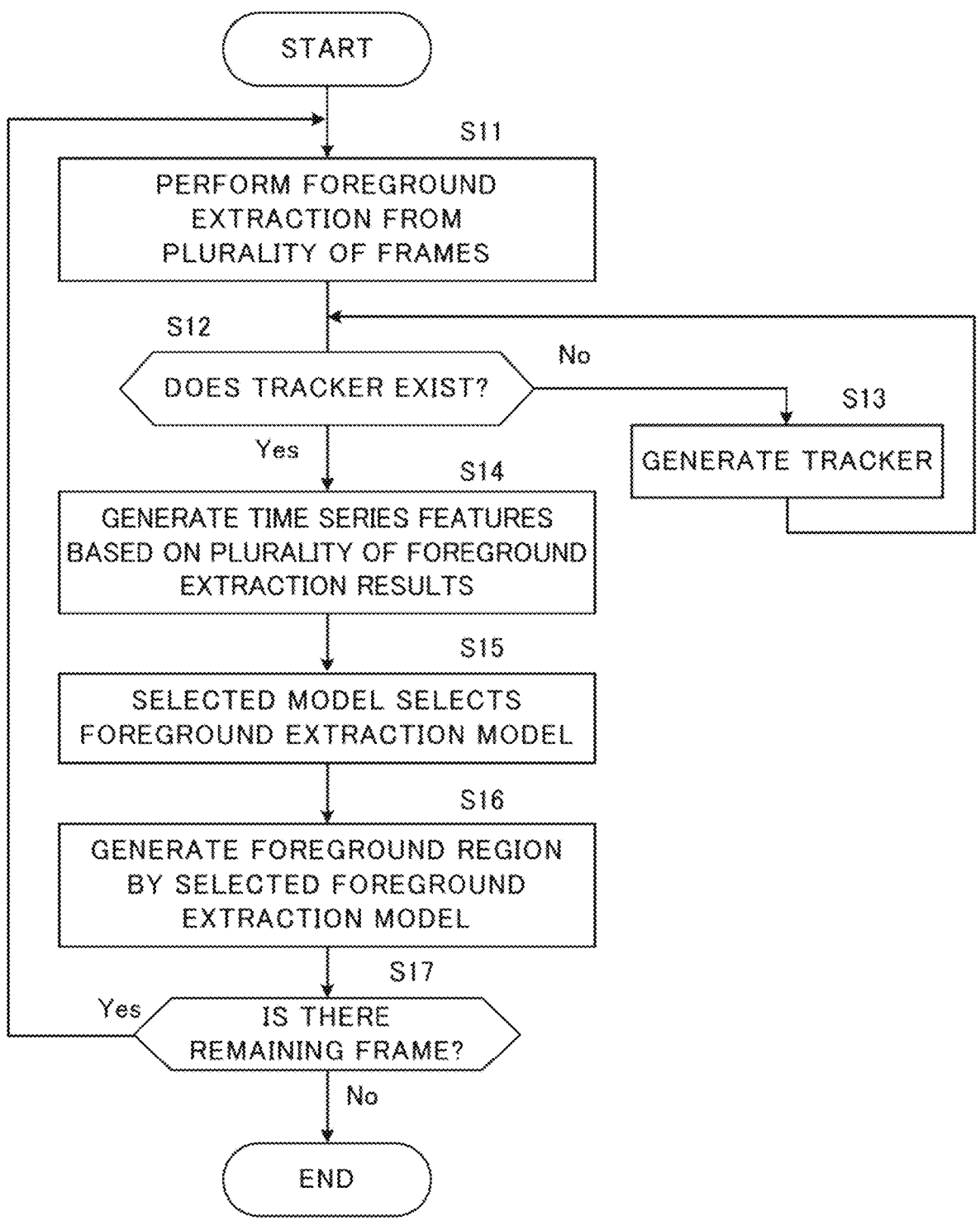
FIG. 6 is a flowchart of a foreground extraction process by the foreground extraction apparatus.

FIG. 6 is a flowchart of the foreground extraction process performed by the foreground extraction apparatus 100. This process is implemented by the processor 13 illustrated in FIG. 1, which executes a program prepared in advance and operates as each element illustrated in FIG. 2.

First, the time series feature generation unit 21 performs the foreground extraction from a plurality of frames of the input images by using a plurality of foreground extraction models, and generates foreground extraction results (step S11). Next, the time series feature generation unit 21 determines whether or not a tracker exists (step S12). When the tracker does not exist (step S12: No), the time series feature generation unit 21 generates a tracker in the aforementioned method (step S13).

When the tracker exists (step S12: Yes), the time series feature generation unit 21 generates a time series feature for each of the foreground extraction models based on the foreground extraction results (step S14). This time series feature indicates the score $F_{(i)}$ for each of foreground extraction models. Next, the foreground extraction model selection unit 22 selects the foreground extraction model based on the score $F_{(i)}$ for each of the foreground extraction models (step S15). After that, the foreground region generation unit 23 generates a foreground region using the selected foreground extraction model (step S16).

Next, it is determined whether or not there is a remaining frame in the input images (step S17). When there is the remaining frame (step S17: Yes), the process goes back to step S11. On the other hand, when there is no remaining frame (step S17: No), the process is terminated.

(Modification of the Tracker Generation Method)

Figure 7:
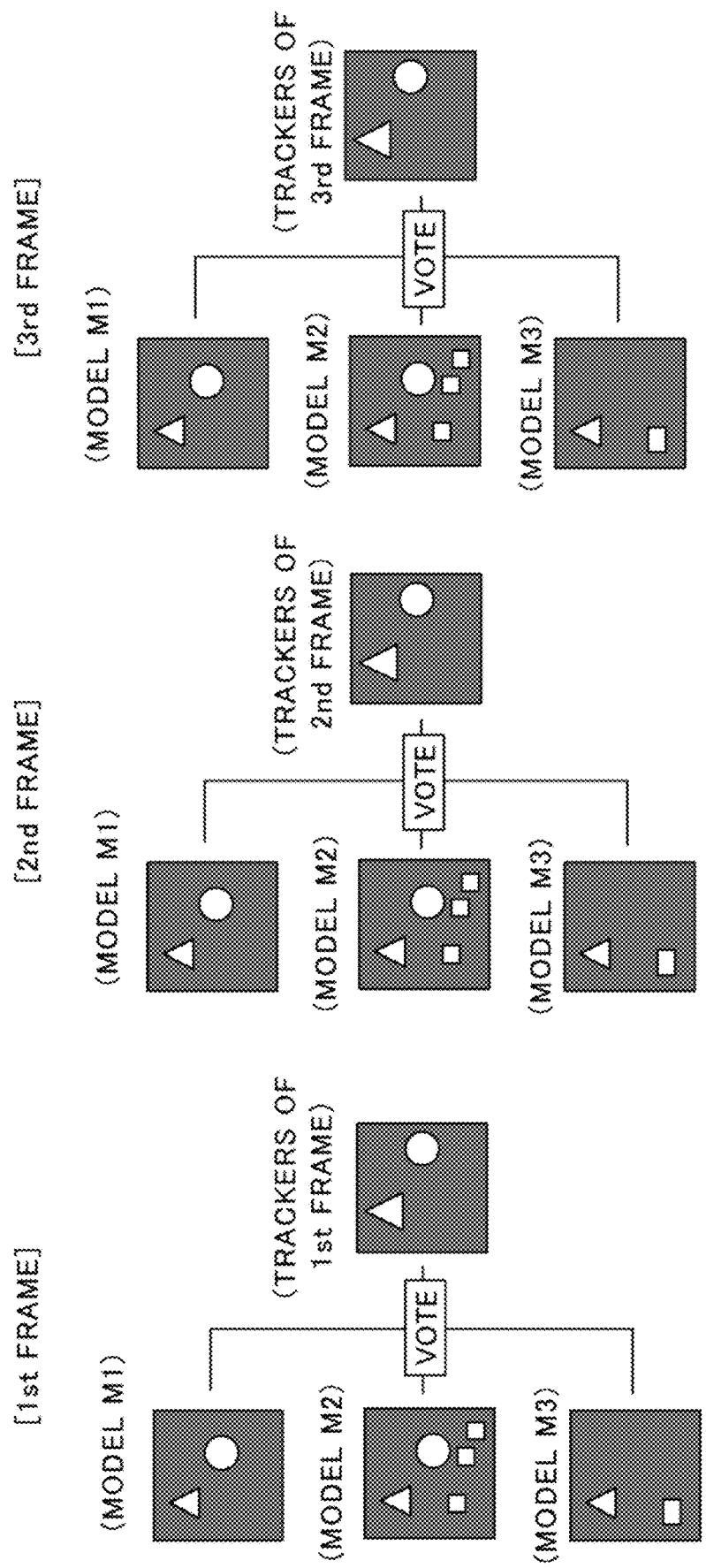
FIG. 7 illustrates a method for generating trackers using images of a plurality of frames.
Figure 8A:
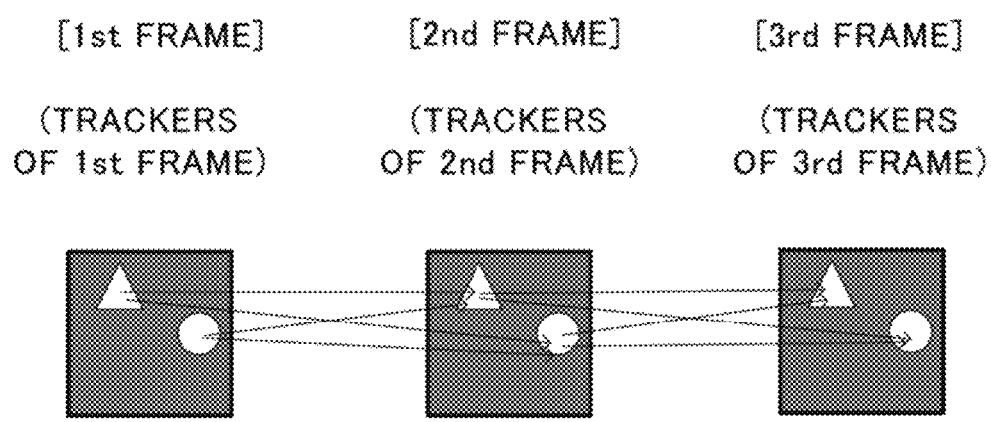
FIG. 8A and FIG. 8B illustrate the method for generating trackers using the images of the plurality of frames.
Figure 8B:
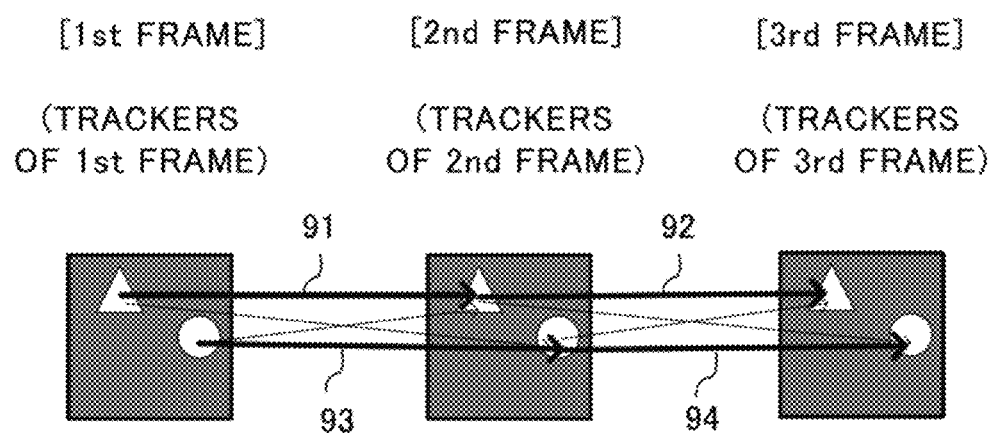

In the tracker generation method described with reference to FIG. 3, a tracker is generated from an image of one frame. Alternatively, a plurality of frame images may be used to generate a tracker. FIG. 7 and FIG. 8 illustrate a method for generating the tracker using the plurality of frame images. As illustrated in FIG. 7, the time series feature generation unit 21 first generates trackers in the aforementioned method in each of a first frame to a third frame. Subsequently, as illustrated in FIG. 8A, the tracker in each frame is connected to all the trackers in the next frame. After that, the time series feature generation unit 21 selects an optimum connection based on a movement distance in the images and a foreground degree from a pair of trackers indicated by each connection. In the example in FIG. 8B, a triangular tracker is generated by connections 91 and 92 and a circular tracker is generated by connections 93 and 94, based on respective movement distances in the images and respective foreground degrees.

Second Example

Next, a second example of the first example embodiment will be described. The foreground extraction apparatus 100 of the first example selects an appropriate foreground extraction model, and uses the selected foreground extraction model to generate and output a foreground region. A foreground extraction apparatus 100x according to the second example further identifies an object corresponding to a foreground using the generated foreground region.

(Functional Configuration)

Figure 9:
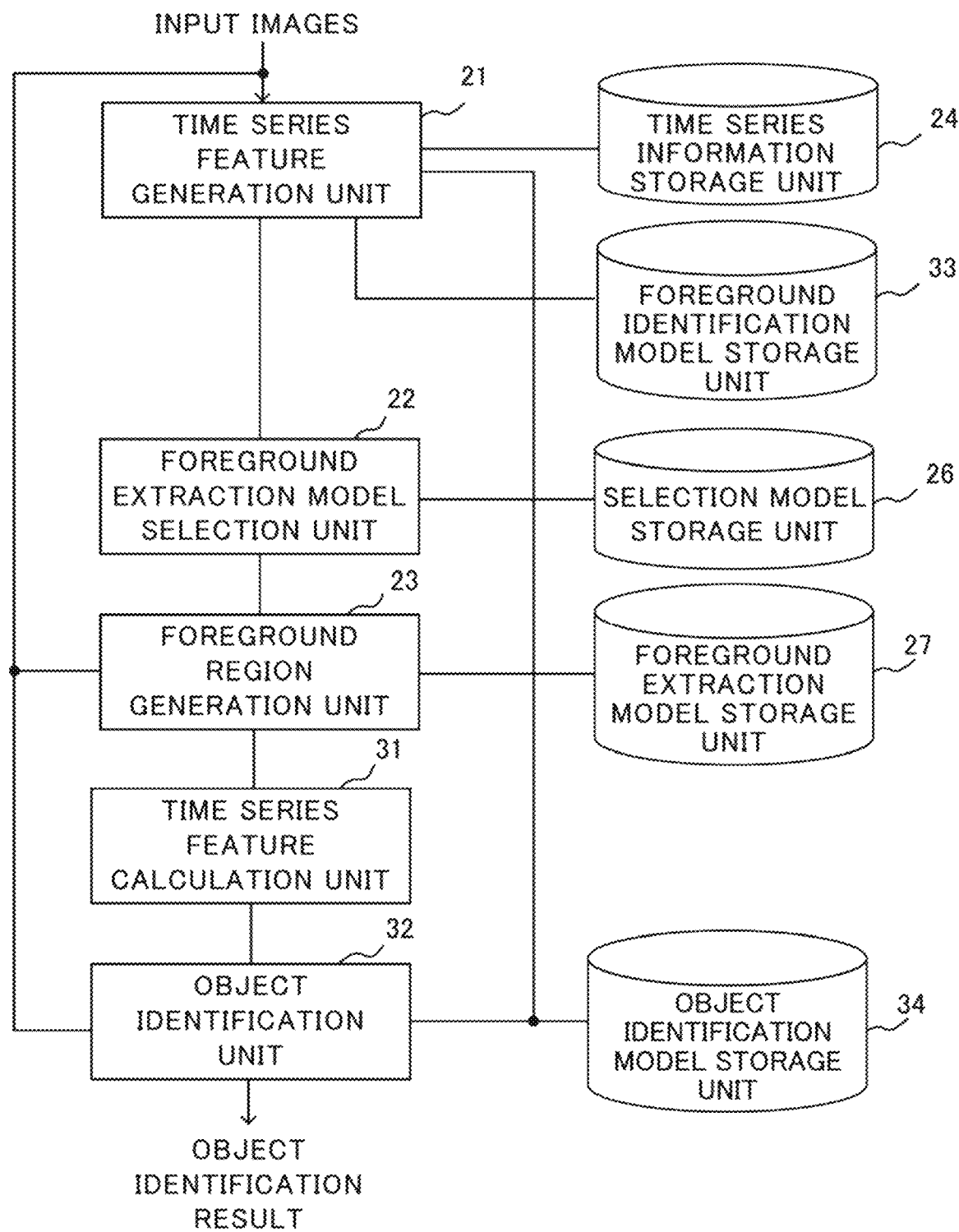
FIG. 9 illustrates a functional configuration of a foreground extraction apparatus according to a second example of the first example embodiment.

FIG. 9 is a block diagram for explaining a functional configuration of the foreground extraction apparatus 100x according to the second example of the first example embodiment. As understood from comparison with FIG. 2, the foreground extraction apparatus 100x according to the second example includes a time series feature calculation unit 31, an object identification unit 32, and an object identification model storage unit 34 in addition to the configuration of the foreground extraction apparatus 100 according to the first example. In addition, instead of the classification model storage unit 25 of the first example, a foreground identification model storage unit 33 is provided.

Similarly to the first example embodiment, the time series feature generation unit 21 extracts time series features based on the input images. However, in place of the classification model in the first example, the time series feature generation unit 21 acquires a foreground identification model from the foreground identification model storage unit 33, and calculates a foreground degree using the foreground identification model. Incidentally, the foreground identification model is regarded as a model that outputs the foreground degree (score) indicating a probability that a foreground is an object to be identified based on a shape of the input foreground.

The foreground extraction model selection unit 22 and the foreground region generation unit 23 operate in the same manner as those in the first example. The time series feature calculation unit 31 newly calculates the time series feature for the foreground region output by the foreground region generation unit 23. Specifically, the time series feature calculation unit 31 calculates a score F as the time series features using the aforementioned formula (1) for the foreground region generated by the foreground region generation unit 23. At this time, the time series feature calculation unit 31 may calculate the score F for the foreground extraction model selected by the foreground extraction model selection unit 22.

Figure 10:
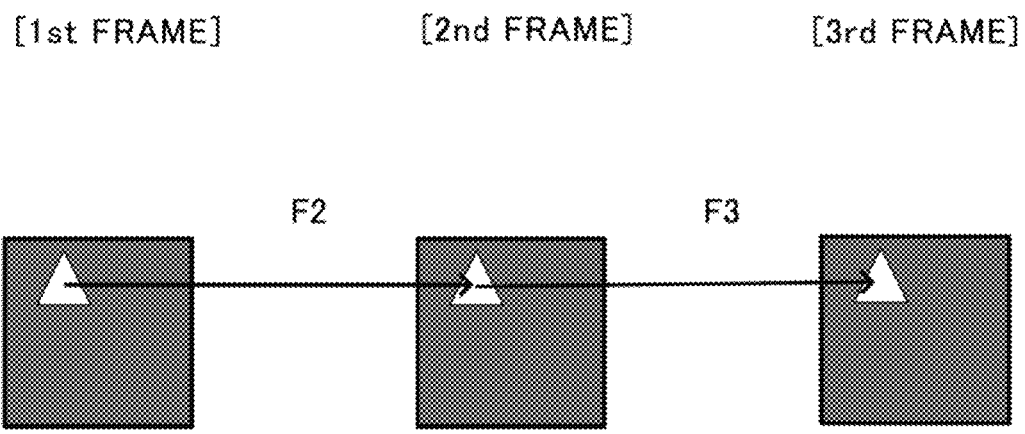
FIG. 10 is a diagram for explaining a method of an object identification by an object identification unit.

The object identification unit 32 acquires an object identification model from the object identification model storage unit 34, and identifies each object using the object identification model. Specifically, the object identification unit 32 identifies the object based on foreground regions extracted in the plurality of frames and the time series features calculated for each frame using the object identification model. FIG. 10 is a diagram illustrating a method of an object identification by the object identification unit 32. In an example in FIG. 10, it is assumed that the object identification unit 32 performs the object identification using images of three successive frames. In this case, the object identification unit 32 performs identification for each object based on the foreground regions included in the images of the first frame to the third frame, a time series features (a score F2) calculated based on foreground regions included in the first frame through the second frame, and a time series feature (a score F3) calculated based on each foreground region included in the second frame and the third frame. The object identification unit 32 outputs an object identification result for each object.

(Object Identification Process)

Figure 11:
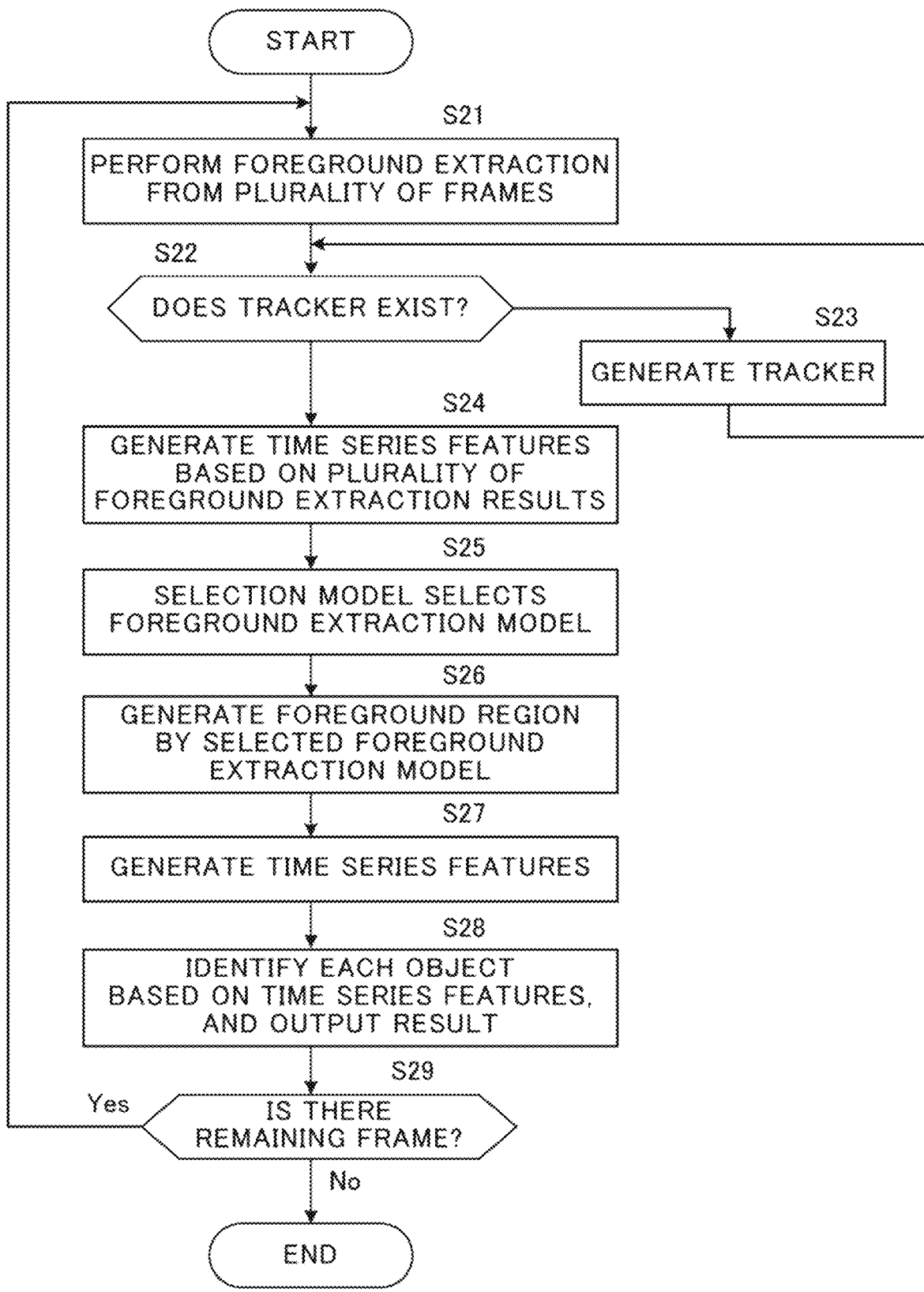
FIG. 11 is a flowchart of an object identification process by the object identification unit.

FIG. 11 is a flowchart of an object identification process performed by the foreground extraction apparatus 100x. This process is implemented by the processor 13 illustrated in FIG. 1, which executes a program prepared in advance and operates as each element illustrated in FIG. 2. Here, since steps S21 to S26 of the object identification process illustrated in FIG. 11 are the same as steps S11 to S16 of the foreground extraction process illustrated in FIG. 6, explanations thereof will be omitted.

In step S26, when a foreground region is generated using the foreground extraction model selected by the selection model, the time series feature calculation unit 31 generates a time series feature for the generated foreground region (step S27). Then, the object identification unit 32 identifies an object corresponding to the foreground region based on the foreground region in the images of the plurality of frames and the generated time series feature, and outputs the object identification result (step S28). At this time, the foreground that is not identified as a predetermined object is removed as a noise.

Next, it is determined whether or not there is a remaining frame in the input image (step S29). When there is the remaining frame (step S29: Yes), the process goes back to step S21. On the other hand, when there is no remaining frame (step S29: No), the object identification process is terminated.

As described above, according to the second example of the first example embodiment, after the foreground region is extracted using the appropriate foreground extraction model, it is possible to identify an object corresponding to the foreground region. Moreover, by identifying the object, it is possible to remove the foreground region other than a predetermined object as a noise.

Second Example Embodiment

Next, a second example embodiment of the present disclosure will be described. In the first example embodiment, time-series features are generated from input images, and an appropriate foreground extraction model is selected using the generated time-series features. On the other hand, in the second example embodiment, the input images and correct data for the input images are used to train a selection model for selecting a foreground extraction model. After that, by using the trained selection model, an appropriate foreground selection model is selected from among a plurality of foreground selection models. Since a hardware configuration of a foreground extraction apparatus according to the second example embodiment is the same as that of the foreground extraction apparatus according to the first example embodiment, explanations thereof will be omitted.

First Example (Functional Configuration)

Figure 12A:
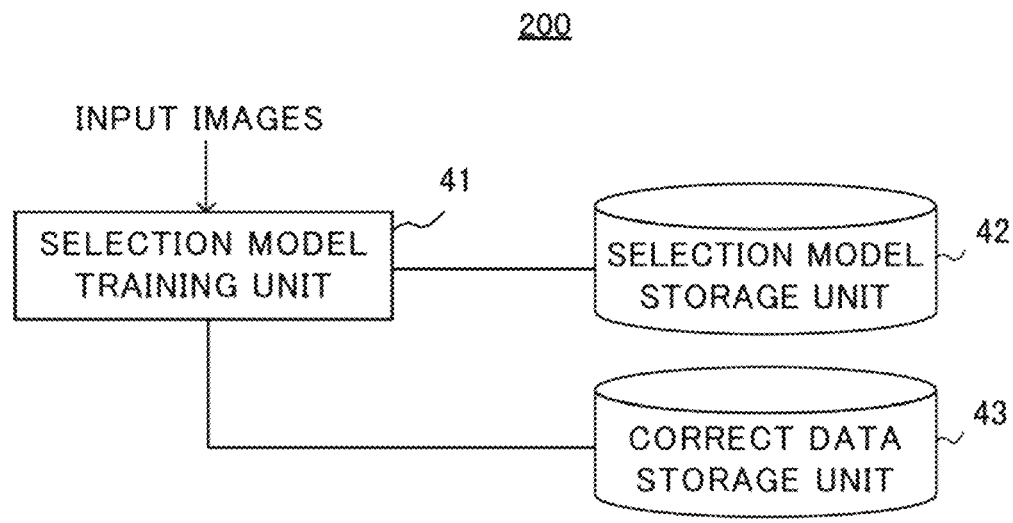
FIG. 12A and FIG. 12B illustrate functional configurations of a foreground extraction apparatus according to a first example of a second example embodiment.

FIG. 12A is a block diagram illustrating a functional configuration of the foreground extraction apparatus 200 at a time of learning according to a first example of the second example embodiment. The foreground extraction apparatus 200 at a time of learning includes a selection model training unit 41, a selection model storage unit 42, and a correct data storage unit 43.

The selection model storage unit 42 stores a selection model for selecting one or more appropriate foreground selection models from among a plurality of foreground extraction models. The selection model training unit 41 acquires the selection model from the selection model storage unit 42, and performs the learning for the selection model. Specifically, the selection model training unit 41 acquires correct answer data corresponding to an input image from the correct answer data storage unit 43, and trains the selection model using the input image and the correct answer data corresponding thereto. When the learning is completed, the selection model training unit 41 stores the trained selection model in the selection model storage unit 42.

Figure 12B:
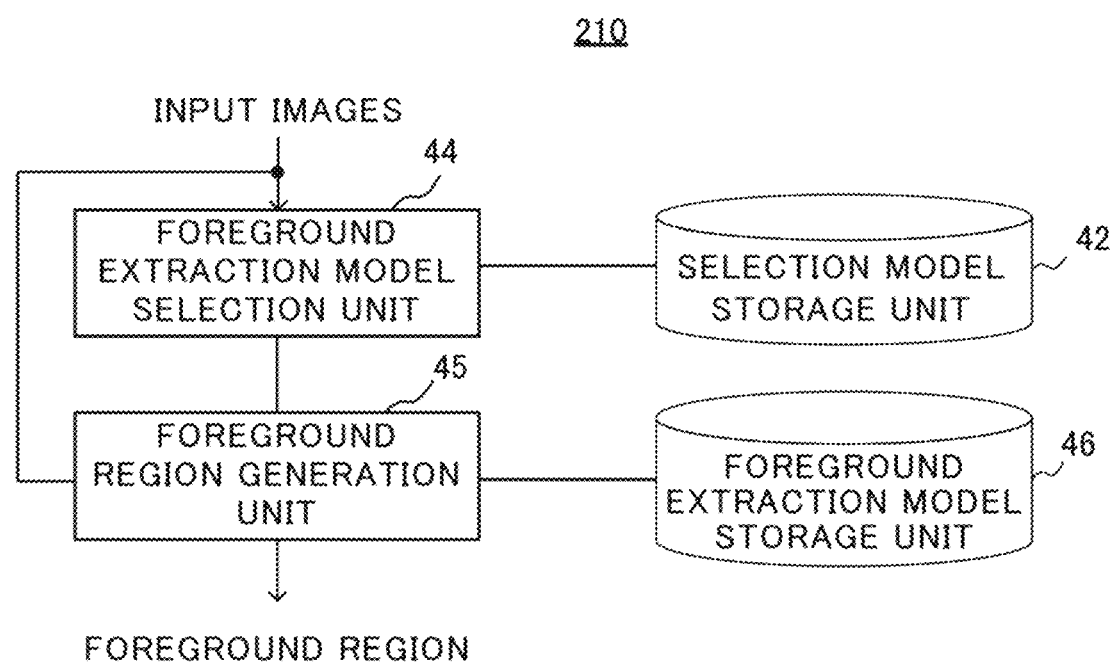

FIG. 12B is a block diagram illustrating a functional configuration of a foreground extraction apparatus 210 at a time of prediction. The time of prediction refers to as the time when an object is actually detected from a captured image. The foreground extraction apparatus 210 at the time of prediction includes a foreground extraction model selection unit 44, the selection model storage unit 42, a foreground region generation unit 45, and a foreground extraction model storage unit 46. Note that the selection model that has been trained by the foreground extraction apparatus 200 at the time of learning is stored in the selection model storage unit 42.

At the time of prediction, the foreground extraction model selection unit 44 acquires the trained selection model stored in the selection model storage unit 42, selects an optimum foreground extraction model based on the input image, and outputs information indicating the optimum foreground extraction model to the foreground region generation unit 45. The foreground extraction model storage unit 46 stores a plurality of foreground extraction models in advance. The foreground region generation unit 45 acquires the foreground extraction model selected by the foreground extraction model selection unit 44 from the foreground extraction model storage unit 46, generates each foreground region based on the input image using the foreground extraction model, and outputs the foreground region. Hence, by using the trained selection model, it is possible to select an appropriate foreground extraction model from the plurality of foreground extraction models, and to extract each foreground region.

(Selection Model)

Figure 13:
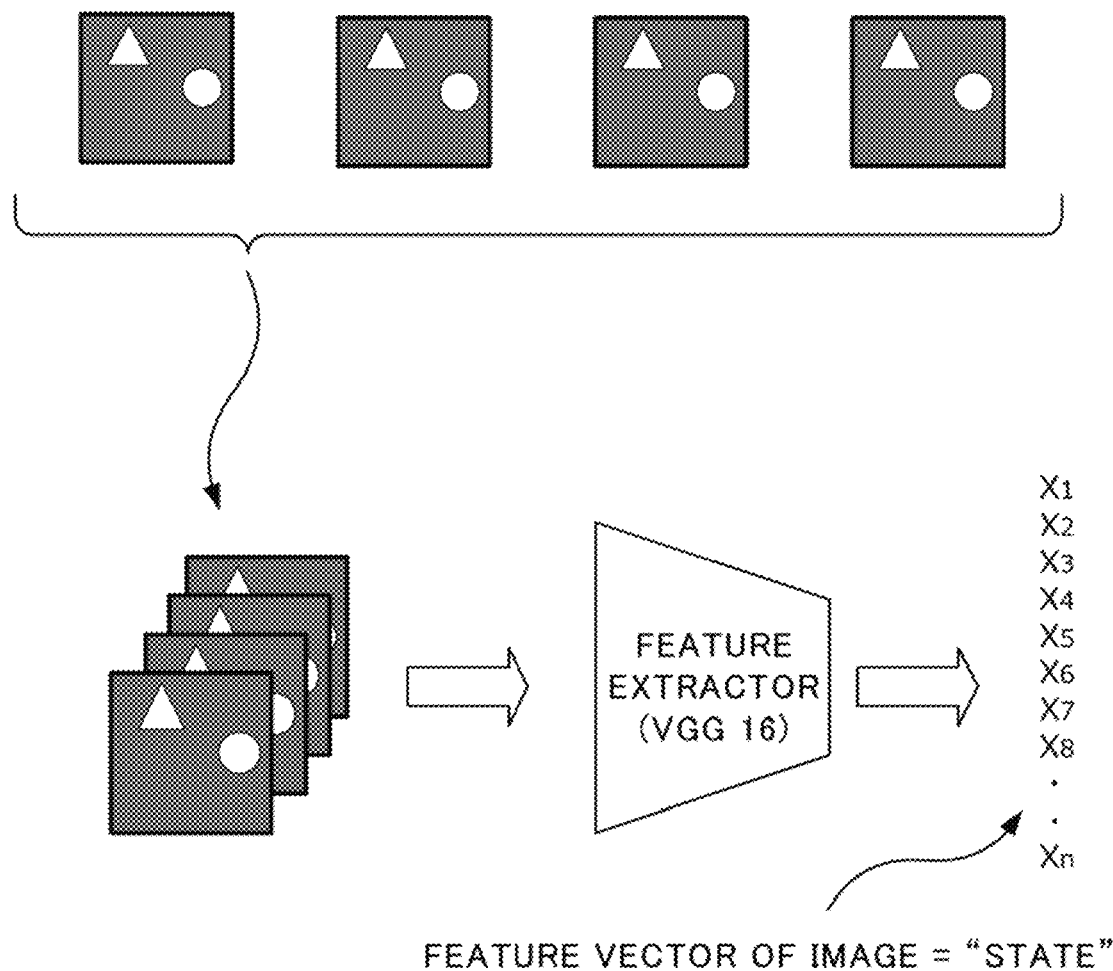
FIG. 13 illustrates an extraction method of feature vectors in the first example of the second example embodiment.

Next, a selection model and a learning method thereof will be described according to a first example of the second example embodiment. In the first example, the selection model is trained by using a technique of a reinforcement learning. First, as illustrated in FIG. 13, the selection model training unit 41 inputs N adjacent frames of input images (four frames in an example in FIG. 13) to a feature extractor using a neural network to generate a feature vector of the input images. The feature extractor may be any feature extractor utilized in a general object recognition, and for instance, a VGG16, a ResNet, or the like can be used. Note that the feature extractor is already trained.

FIG. 14 schematically illustrates the learning method in the selection model training unit 41. The selection model training unit 41 uses feature vectors of input images obtained by the feature extractor as a "state 's'" in the reinforcement learning. In addition, the selection model training unit 41 sets an action for selecting an appropriate one from among the plurality of foreground extraction models as "$a_i$". The action $a_i$ is represented as follows.

[Formula 2]

$$ai \in \text{(foreground extraction model 1,} \quad \text{foreground extraction model 2,} \quad \text{forground extraction model } i\text{)} \quad (2)$$

Also, in a case where a reward when the action $a_i$ is selected in the state 's' is denoted by a 'r', the reward r is given as a difference between an output of the foreground extraction model and correct data as follows.

[Formula 3]

$$r = R(s, a_i) = I_{ik} - I \quad (3)$$

Note that an '$I_{ik}$' denotes a result of the foreground extraction in a k model at a time of an i frame, and an 'I' denotes correct answer data. Therefore, the smaller the difference between an output of the foreground extraction model selected by the selection model and the correct data, the higher the reward r is given.

The selection model training unit 41 trains a selection model $Q(s, a_i)$ (hereinafter, also referred to as a "Q value" or a "value Q") using the state 's' regarded as a feature vector of an image, the action $a_i$ for selecting the foreground extraction model, and the reward r. The selection model $Q(s, a_i)$ is given by the following formula.

[Formula 4]

$$Q(s_{t+1}, a_{t+1}) \leftarrow Q(s_t, a_t) + \alpha\left(r_{t+1} + \gamma \max_a Q(s_{t+1}, a) - Q(s_t, a_t)\right) \quad (4)$$

Here, an '$\alpha$' and a '$\gamma$' are parameters decided by a designer. Also, a number of learning, a termination condition, and the like are decided by the designer. When the learning is completed, the trained selection model is stored in the selection model storage unit 42.

Figure 15:
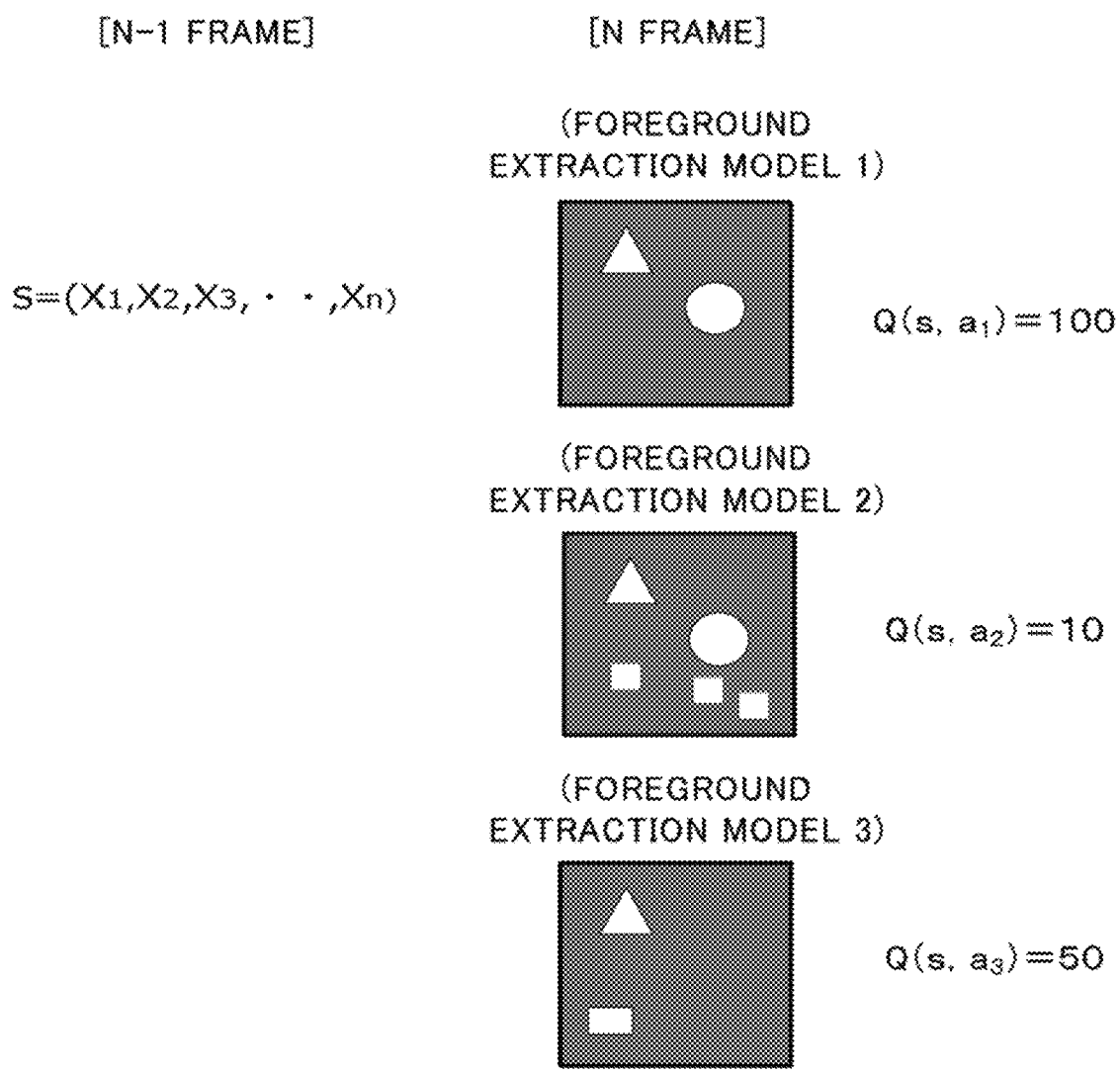
FIG. 15 illustrates an example for selecting a foreground extraction model.

At the time of prediction, the foreground extraction model selection unit 44 selects an appropriate foreground extraction model based on an input image using the trained selection model. FIG. 15 illustrates an example for selecting a foreground extraction model. In this example, the selection model calculates a Q value for three foreground extraction models 1 through 3, and the Q value by the foreground extraction model 1 indicates a maximum value. Accordingly, the foreground extraction model selection unit 44 selects the foreground extraction model 1. Moreover, for instance, in a case where the selection model selects top two foreground extraction models, the foreground extraction models 1 and 3 may be selected from larger Q values. After that, the foreground region generation unit 45 extracts each foreground region from the input image using the selected foreground extraction model.

Second Example

Next, a second example of the second example embodiment will be described. A hardware configuration of a foreground extraction apparatus according to the second example is the same as that of the first example embodiment illustrated in FIG. 1, and functional configurations are the same as those of the first example of the second example embodiment illustrated in FIG. 12A and FIG. 12B.

(Selection Model)

Figure 16:
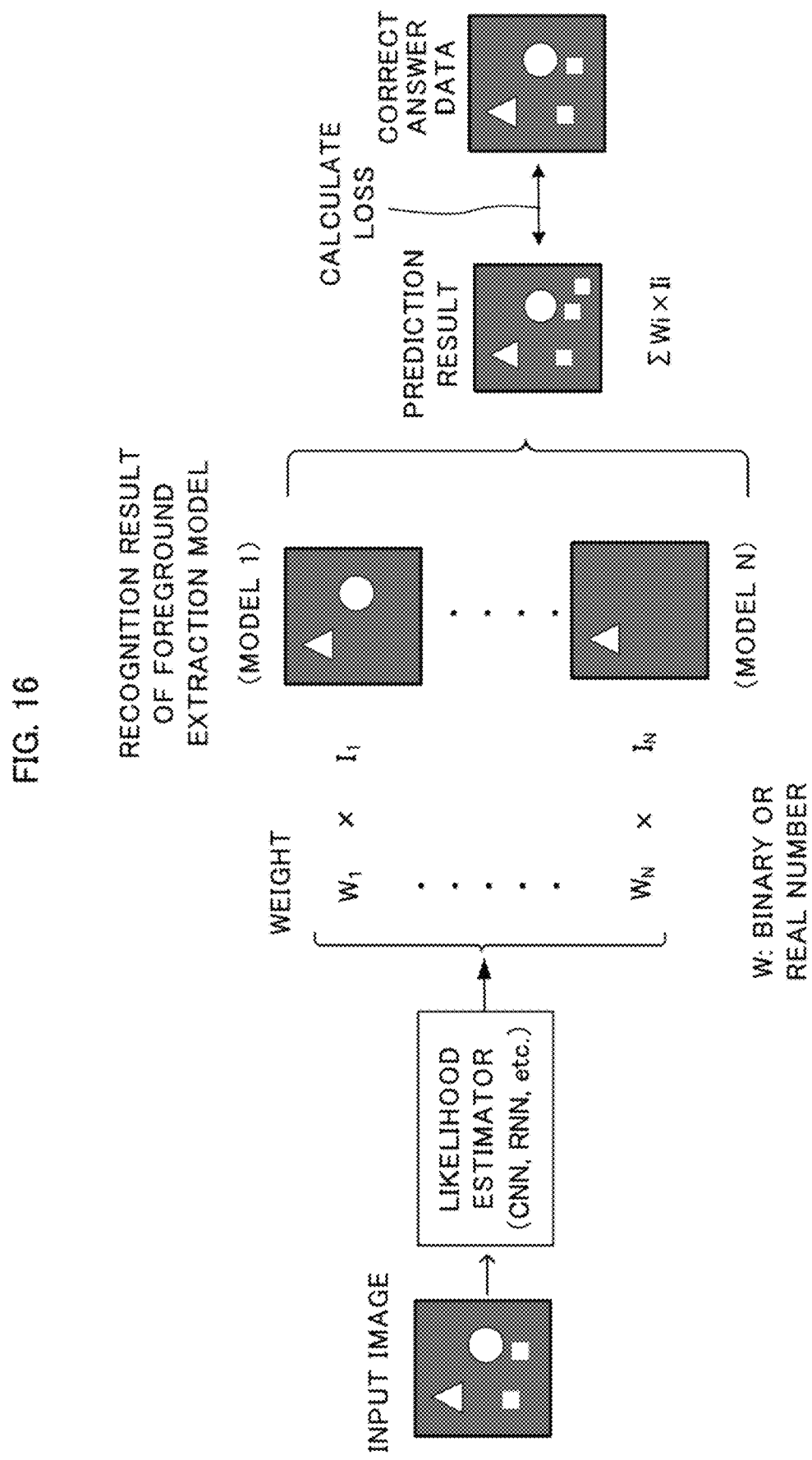
FIG. 16 schematically illustrates a learning method of a selection model according to a second example of the second example embodiment.

Next, a selection model and a learning method thereof will be described according to a second example of the second example embodiment. In the second example, the selection model is trained using a technique of supervised learning. FIG. 16 schematically illustrates the learning method of a selection model according to the second example of the second example embodiment.

At a time of learning, each input image is first input to a likelihood estimator. The likelihood estimator is formed by a neural network, and for instance, a CNN (Convolutional Neural Network), a RNN (Recurrent Neural Network), or the like can be used. The likelihood estimator learns a selection likelihood for each foreground extraction model based on the input images. In the example in FIG. 16, the likelihood estimator outputs, for each of the foreground extraction models 1 through N, a weight W indicative of a mixing ratio for the model. After that, using weight $W_1$ through $W_N$ for respective foreground extraction models, a prediction result ($\Sigma W_i \times I_i$) is generated by weighting and summing recognition results $I_1$ through $I_N$ of the foreground extraction models 1 through N.

The selection model training unit 41 learns parameters of the likelihood estimator so that a difference (loss) between the prediction result and the correct data becomes smaller. When the learning is completed, the selection model training unit 41 stores a selection model including the parameters of the trained likelihood estimator in the selection model storage unit 42.

At a time of prediction, the foreground extraction model selection unit 44 acquires the trained selection model from the selection model storage unit 42, and selects an appropriate foreground extraction model based on an input image using the trained selection model. Specifically, the selection model selects one or more foreground extraction models depending on the weight $W_i$ output from the likelihood estimator. The foreground region generation unit 45 acquires the selected foreground extraction models from the foreground extraction model storage unit 46, and extracts each foreground region from the input image at a ratio of the weight $W_i$ using the selected foreground extraction models.

(Modification)

Figure 17:
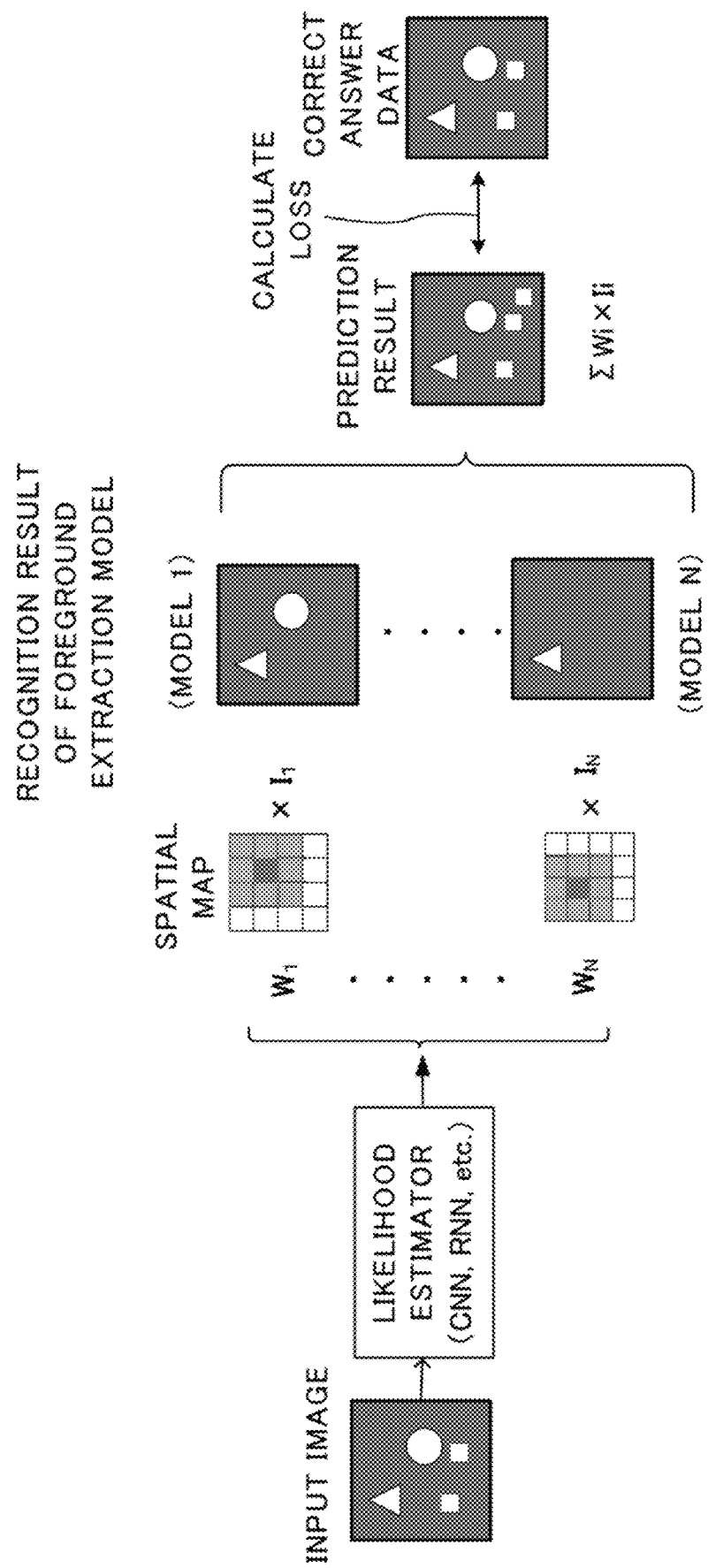
FIG. 17 illustrates a learning method of a selection model according to a modification of the second example of the second example embodiment.

FIG. 17 schematically illustrates a learning method of a selection model according to a modification of the second example of the second example embodiment. In the second example embodiment illustrated in FIG. 16, the likelihood estimator outputs a weight W for each foreground extraction model. In contrast, in this variation, the likelihood estimator outputs, for each foreground extraction model, a spatial map W indicating a selection likelihood of the model. Specifically, the spatial map W is a map of n×n dimensions, and each of coefficients corresponding to respective pixels indicates a likelihood of a foreground extraction model at a corresponding location in the input image. Note that a size of the spatial map corresponds to a part of the input image. In an example in FIG. 17, in pixels of the spatial map W, the darker color the pixel, the higher the coefficient is set.

Each spatial map W is multiplied by recognition results $I_1$ through $I_N$ of each foreground extraction model, and a sum of them is output as a prediction result. Specifically, the selection model selects one or more foreground extraction models depending on a spatial map $W_i$ output from likelihood estimator. The foreground region generation unit 45 acquires the selected foreground extraction model from the foreground extraction model storage unit 46, and extracts each foreground region from the input image using the selected foreground extraction model according to the spatial map.

As described above, by outputting the spatial map indicating a selection likelihood for each of the foreground extraction model, each foreground region is extracted by selecting a highly appropriate foreground extraction model for each portion of the input image. For instance, in the example in FIG. 17, it is assumed that the foreground extraction model 1 has a property of extracting a circular foreground with high accuracy, and the foreground extraction model N has a property of extracting a triangular foreground with high accuracy. In this case, a spatial map $W_1$ corresponding to the foreground extraction model 1 focuses on a circular portion in the input image, and a spatial map $W_N$ corresponding to the foreground extraction model N focuses on a triangle portion in the input image. Accordingly, an optimal foreground extraction model is selected for each of portions forming one input image. By this process, even in a case where objects with different detectability of each foreground extraction model are captured in the same frame, it is possible to select an optimal foreground extraction model for detecting each of objects. Incidentally, the operation when performing the prediction using the trained selection model is the same as that in the case of the second example of the second example embodiment.

Third Example Embodiment

Figure 18:
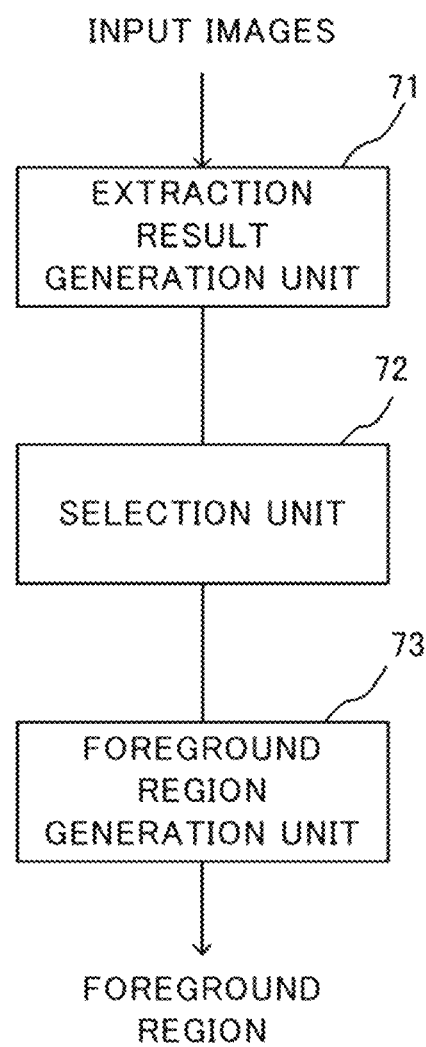
FIG. 18 illustrates a functional configuration of a foreground extraction apparatus according to a third example embodiment.

FIG. 18 is a block diagram illustrating a functional configuration of a foreground extraction apparatus 70 according to the third example embodiment. A hardware configuration of the foreground extraction apparatus 70 is the same as that in FIG. 1. As illustrated, the foreground extraction apparatus 70 includes an extraction result generation unit 71, a selection unit 72, and a foreground region generation unit 73.

The extraction result generation unit 71 performs the foreground extraction using a plurality of foreground extraction models for an input image to generate a foreground extraction result. The selection unit 72 selects one or more foreground extraction models from the plurality of foreground extraction models using the foreground extraction result by each foreground extraction model. The foreground region generation unit 73 extracts the foreground region from the input image using the selected foreground extraction model.

A part or all of the example embodiments described above may also be described as the following supplementary notes, but not limited thereto.

(Supplementary Note 1)
1. A foreground extraction apparatus comprising:
an extraction result generation unit configured to generate respective foreground extraction results by performing a foreground extraction using a plurality of foreground extraction models with respect to an input image;
a selection unit configured to select one or more foreground extraction models from among the plurality of foreground extraction models by using the respective foreground extraction results of the plurality of foreground extraction models; and
a foreground region generation unit configured to extract each foreground region based on the input image by using the selected one or more foreground extraction models.

(Supplementary Note 2)
2. The foreground extraction apparatus according to supplementary note 1, wherein the selection unit generates time series features respectively for the plurality of foreground extraction models based on the input image, and selects the foreground extraction model based on the generated time series.

(Supplementary Note 3)
3. The foreground extraction apparatus according to supplementary note 2, wherein the selection unit generates each tracker based on the input image, calculates respective distances between each tracker and each foreground included in the respective foreground extraction results, and generates the time series features using the respective distances.

(Supplementary Note 4)
4. The foreground extraction apparatus according to supplementary note 3, wherein the selection unit calculates foreground degrees of foregrounds included in the foreground extraction results, and generates the time series features using the foreground degrees.

(Supplementary Note 5)
5. The foreground extraction apparatus according to supplementary note 4, wherein
the time series features are indicated by values each of which is acquired by dividing a total value, which is obtained by dividing the distances by respective foreground degrees for all trackers and all foregrounds, by a number of the trackers, and
the selection unit selects a foreground extraction model having a minimum value among the time series features.

(Supplementary Note 6)
6. The foreground extraction apparatus according to any one of supplementary notes 2 through 5, further comprising:
a time series feature calculation unit configured to calculate a time series feature corresponding to each foreground region generated by the foreground region generation unit, and
an object identification unit configured to identify an object corresponding to each foreground region based on the input image and the time series feature calculated by the time series feature calculation unit.

(Supplementary Note 7)
7. The foreground extraction apparatus according to supplementary note 1, wherein the selection unit selects the foreground extraction models by using a selection model which is trained by the input image and correct answer data of the foreground extraction results.

(Supplementary Note 8)
8. The foreground extraction apparatus according to supplementary note 7, wherein
the selection model is trained in order for a value Q(s, a) to be greater, in which a state s denotes a feature vector extracted from the input image, a reward r denotes a difference between the foreground extraction result and the correct answer data, and the value Q denotes an action a for selecting any of the plurality of foreground extraction models in the state s, and
the selection unit selects the foreground extraction model based on the value Q(s, a).

(Supplementary Note 9)

9. The foreground extraction apparatus according to supplementary note 8, wherein the value Q(s, a) is given by:

$$Q(s_{t+1},\ a_{t+1}) \leftarrow Q(s_t, a_t) + \alpha\left(r_{t+1} + \gamma \max_a Q(s_{t+1}, a) - Q(s_t, a_t)\right). \quad \text{[Formula 5]}$$

(Supplementary Note 10)

10. The foreground extraction apparatus according to supplementary note 7, wherein
the selection model is trained in order for a difference between a prediction result and the correct answer data to be smaller, in which the prediction result is represented by a weighted sum of respective weights for the foreground extraction models calculated by a likelihood estimator based on the input image and respective foreground extraction results of the foreground extraction models, and
the selection unit selects the foreground extraction models based on the respective weights for the foreground extraction models.

(Supplementary Note 11)

11. The foreground extraction apparatus according to supplementary note 7, wherein
the selection model is trained in order for a difference between a prediction result and the correct answer data to be smaller, in which the prediction result is represented by summing products of respective spatial maps of the foreground extraction models calculated by a likelihood estimator based on the input image and the respective foreground extraction results of the foreground extraction models, and
the selection unit selects the foreground extraction models based on the respective spatial maps for the foreground extraction models.

(Supplementary Note 12)

12. A foreground extraction method comprising:
generating respective foreground extraction results by performing a foreground extraction using a plurality of foreground extraction models with respect to an input image;
selecting one or more foreground extraction models from among the plurality of foreground extraction models by using the respective foreground extraction results of the plurality of foreground extraction models; and
extracting each foreground region based on the input image by using the selected one or more foreground extraction models.

(Supplementary Note 13)

13. A recording medium storing a program, the program causing a computer to perform a process comprising:
generating a foreground extraction result by performing a foreground extraction using a plurality of foreground extraction models with respect to an input image;
selecting one or more foreground extraction models from among the plurality of foreground extraction models by using the foreground extraction result of each of the plurality of foreground extraction models; and
extracting each foreground region based on the input image by using the selected one or more foreground extraction models.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

21 Time series feature generation unit
22, 44 Foreground extraction model selection unit
23, 45 Foreground region generation unit
24 Time series information storage unit
25 Classification model storage unit
26, 42 Selection model storage unit
27, 46 Foreground extraction model storage unit
31 Time series feature calculation unit
32 Object identification unit
33 Foreground identification model storage unit
41 Selection model training unit
100, 100x, 200, 210 Foreground extraction apparatus

What is claimed is:

1. A foreground extraction apparatus comprising:
a memory storing instructions; and
one or more processors configured to execute the instructions to:
generate respective foreground extraction results by performing a foreground extraction using a plurality of foreground extraction models with respect to an input image;
select one or more foreground extraction models from among the plurality of foreground extraction models by using the respective foreground extraction results of the plurality of foreground extraction models; and
extract each foreground region based on the input image by using the selected one or more foreground extraction models,
wherein the one or more processors:
generate time series features respectively for the plurality of foreground extraction models based on the input image, and select the foreground extraction model based on the generated time series;
generate each tracker based on the input image, calculate respective distances between each tracker and each foreground included in the respective foreground extraction results, and generate the time series features using the respective distances; and
calculate foreground degrees of foregrounds included in the foreground extraction result, and generate the time series features using the foreground degrees,
wherein the time series features are indicated by values each of which is acquired by dividing a total value, which is obtained by dividing the distances by respective foreground degrees for all trackers and all foregrounds, by a number of the trackers, and
wherein the one or more processors:
select a foreground extraction model having a minimum value among the time series features.

2. The foreground extraction apparatus according to claim 1, wherein the one or more processors are further configured to
calculate a time series feature corresponding to each foreground region generated by the foreground region generation unit, and
identify an object corresponding to each foreground region based on the input image and the time series feature calculated by the time series feature calculation unit.

3. The foreground extraction apparatus according to claim 1, wherein the one or more processors select the foreground extraction models by using a selection model which is trained by the input image and correct answer data of the foreground extraction results.

4. The foreground extraction apparatus according to claim 3, wherein
the selection model is trained in order for a value Q(s, a) to be greater, in which a state s denotes a feature vector extracted from the input image, a reward r denotes a difference between the foreground extraction result and the correct answer data, and the value Q denotes an action a for selecting any of the plurality of foreground extraction models in the state s, and
the one or more processors select the foreground extraction model based on the value Q(s, a).

5. The foreground extraction apparatus according to claim 4, wherein the value Q(s, a) is given by:

$$Q(s_{t+1}, a_{t+1}) \leftarrow Q(s_t, a_t) + \alpha \left( r_{t+1} + \gamma \max_a Q(s_{t+1}, a) - Q(s_t, a_t) \right).$$

6. The foreground extraction apparatus according to claim 3, wherein
the selection model is trained in order for a difference between a prediction result and the correct answer data to be smaller, in which the prediction result is represented by a weighted sum of respective weights for the foreground extraction models calculated by a likelihood estimator based on the input image and respective foreground extraction results of the foreground extraction models, and
the one or more processors select the foreground extraction models based on the respective weights for the foreground extraction models.

7. The foreground extraction apparatus according to claim 3, wherein
the selection model is trained in order for a difference between a prediction result and the correct answer data to be smaller, in which the prediction result is represented by summing products of respective spatial maps of the foreground extraction models calculated by a likelihood estimator based on the input image and the respective foreground extraction results of the foreground extraction models, and
the one or more processors select the foreground extraction models based on the respective spatial maps for the foreground extraction models.

8. A foreground extraction method performed by a computer and comprising:
generating respective foreground extraction results by performing a foreground extraction using a plurality of foreground extraction models with respect to an input image;
selecting one or more foreground extraction models from among the plurality of foreground extraction models by using the respective foreground extraction results of the plurality of foreground extraction models; and
extracting each foreground region based on the input image by using the selected one or more foreground extraction models,
wherein the computer:
generates time series features respectively for the plurality of foreground extraction models based on the input image, and selects the foreground extraction model based on the generated time series;
generates each tracker based on the input image, calculates respective distances between each tracker and each foreground included in the respective foreground extraction results, and generates the time series features using the respective distances; and
calculates foreground degrees of foregrounds included in the foreground extraction result, and generates the time series features using the foreground degrees,
wherein the time series features are indicated by values each of which is acquired by dividing a total value, which is obtained by dividing the distances by respective foreground degrees for all trackers and all foregrounds, by a number of the trackers, and
wherein the computer:
selects a foreground extraction model having a minimum value among the time series features.

9. A non-transitory computer-readable recording medium storing a program executable by a computer to perform a process comprising:
generating a foreground extraction result by performing a foreground extraction using a plurality of foreground extraction models with respect to an input image;
selecting one or more foreground extraction models from among the plurality of foreground extraction models by using the foreground extraction result of each of the plurality of foreground extraction models; and
extracting each foreground region based on the input image by using the selected one or more foreground extraction models,
wherein the computer:
generates time series features respectively for the plurality of foreground extraction models based on the input image, and selects the foreground extraction model based on the generated time series;
generates each tracker based on the input image, calculates respective distances between each tracker and each foreground included in the respective foreground extraction results, and generates the time series features using the respective distances; and
calculates foreground degrees of foregrounds included in the foreground extraction result, and generates the time series features using the foreground degrees,
wherein the time series features are indicated by values each of which is acquired by dividing a total value, which is obtained by dividing the distances by respective foreground degrees for all trackers and all foregrounds, by a number of the trackers, and
wherein the computer:
selects a foreground extraction model having a minimum value among the time series features.

* * * * *